United States Patent [19]

Rossetti

[11] Patent Number: 4,710,334

[45] Date of Patent: Dec. 1, 1987

[54] METHOD OF PREPARING A TEMPLATE

[75] Inventor: James J. Rossetti, Palmyra, Wis.

[73] Assignee: Advanced Tool Technology, Inc., Lake Geneva, Wis.

[21] Appl. No.: 858,205

[22] Filed: May 1, 1986

[51] Int. Cl.⁴ .................... B29C 33/40; B29C 39/42
[52] U.S. Cl. ....................................... 264/102; 164/15;
164/44; 164/520; 164/521; 264/220; 264/225;
264/299; 264/337; 264/342 R; 264/343;
264/DIG. 78
[58] Field of Search ............... 264/219, 220, 221, 225,
264/226, 227, 299, 313, 317, 337, DIG. 44,
DIG. 78, 2.2, 2.5, 203, 343, 102, 342 R; 164/6,
15, 34, 35, 36, 44, 520, 521; 425/808

[56] References Cited

U.S. PATENT DOCUMENTS

| | | | |
|---|---|---|---|
| 1,998,896 | 4/1935 | Kay | 264/343 X |
| 2,114,162 | 4/1938 | Beal | 264/343 X |
| 2,170,919 | 8/1939 | Thener | 264/343 X |
| 2,793,399 | 5/1957 | Gallay et al. | 264/342 R X |
| 3,222,443 | 12/1965 | Dames, Jr. et al. | 264/313 |
| 4,006,207 | 2/1977 | Yeshin | 264/225 X |

Primary Examiner—Jeffery Thurlow
Assistant Examiner—Leo B. Tentoni
Attorney, Agent, or Firm—Lee, Smith & Zickert

[57] ABSTRACT

A method of preparing a template for a product from a sample of the product. The ultimate template is either larger or smaller in size than the sample. Initially, a mixture of liquid rubber and a curing agent is prepared. The sample is then covered with the mixture and the mixture is permitted to harden to form a temporary mold. The sample is then removed from the mold to form a cavity, and the size of the cavity in the mold is altered to either increase or decrease its dimensions. Finally, a hardenable material, such as an epoxy resin, is poured into the mold to form the template. If an enlarged template is to be formed, the size of the cavity of the mold is increased by immersing the mold in an organic solvent bath. If the size of the mold is to be decreased, an organic solvent is added to the mixture before formation of the mold, and after the mold has been formed, it is heated to shrink the size of the mold.

20 Claims, 2 Drawing Figures

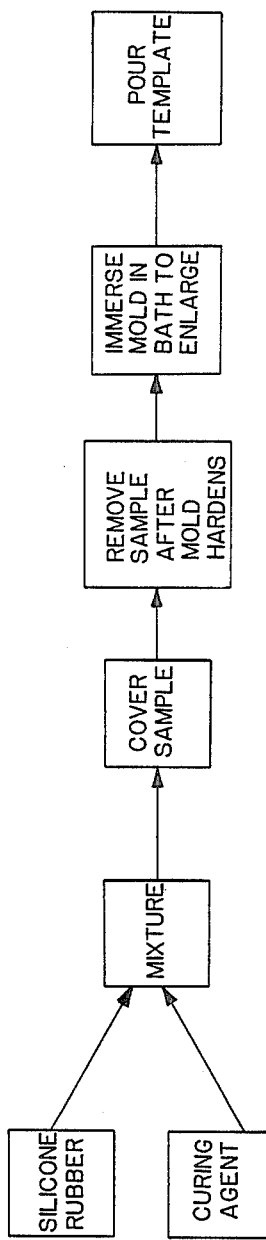
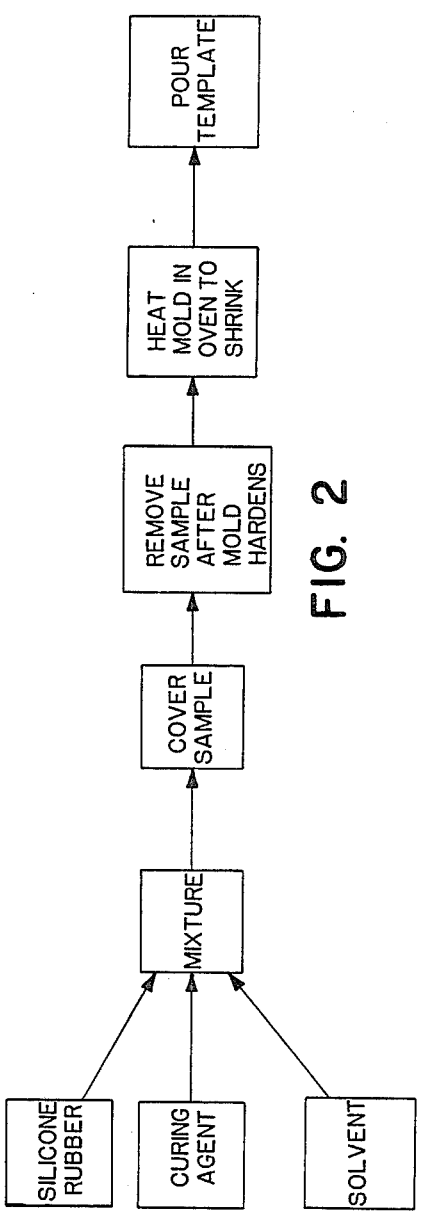

METHOD OF PREPARING A TEMPLATE

BACKGROUND OF THE INVENTION

This invention relates to forming templates which have a primary utilization in formation of molds and dies by an etching process, and in particular to a method of forming a template which is either larger or smaller than the sample of the product from which the template is prepared.

In the manufacture of metal molds or dies, one process for their manufacture includes the use of a template prepared from a sample of the product to be manufactured. Such a process is described in detail in my co-pending U.S. patent application Ser. No. 850,769, filed Apr. 11, 1986.

Frequently, although a template which exactly duplicates the detail of the sample is required, it is desired that the template be of either larger or smaller dimension than the sample. In such cases, in the past preparing such a template required manually duplicating the sample by a skilled artisan. Such a procedure, in addition to being extremely time consuming and costly, is inexact because of introduction of possible human errors. Other times, forgoing a template, tool steel molds are directly manually manufactured to the required size using a sample of the product as a guide, but again, the process is labor intensive, costly, and susceptible to human errors.

SUMMARY OF THE INVENTION

The invention comprises a simple method of preparing an exact template reproduction of a product from a sample of the product. The steps of the method include first preparing a mixture of a liquid rubber and a curing agent for the rubber. Next, the sample is covered with the mixture and the mixture is permitted to harden about the sample to form a temporary mold. After hardening, the sample is removed from the mold, leaving a cavity in the mold which is a negative reproduction of the sample. The size of the cavity is then altered as needed depending on the desired ultimate size of the template. Finally, a hardenable material is poured into the mold to form the template.

If it is desired to produce a template which is larger in dimension than the original sample, the size of the cavity of the mold is increased before the template is poured by immersing the mold in a bath of an enlargant for a predetermined period of time to proportionally increase the size of the mold. Preferably, the enlargant is an organic solvent, such as mineral spirits or naphtha, which is absorbed by the mold.

If a template which is smaller in dimension than that of the sample is desired, in the initial step of combining the liquid rubber and the curing agent, a liquid reductant is added, and the size of the cavity is altered by reducing the size of the mold by evaporating a predetermined portion of the reductant from the mold to proportionally reduce the size of the mold. Similar to the immersion bath used when enlargement of the mold is desired, the reductant can be an organic solvent such as mineral spirits or naphtha. Heating of the mold containing the reductant speeds the shrinking of the mold.

As explained in greater detail in co-pending application Ser. No. 850,769, the template is used to manufacture a mold in a block of tool steel. The template therefore must be sufficiently rigid to survive the mold-making process, and also must be inert to the etchant used in the molding process. An epoxy resin satisfies these requirements, and in accordance with the present invention, the hardenable material can be an epoxy resin which is poured into the temporary mold and then permitted to harden to form the template.

BRIEF DESCRIPTION OF THE DRAWING

The invention is described in greater detail in the following description of examples embodying the best mode of the invention, taken in conjunction with the single sheet of drawings, in which:

FIG. 1 is a block diagram illustrating the basic steps of preparation of a template of greater size than the sample for the template, and FIG. 2 is a similar block diagram but showing the basic steps of preparation of a template which is of a smaller size than the sample of the product from which the template is prepared.

DESCRIPTION OF EXAMPLES EMBODYING THE BEST MODE OF THE INVENTION

FIGS. 1 and 2 illustrate in a block flow chart fashion the template preparation method of the invention, with FIG. 1 pertaining to preparation of a template larger than its sample, while FIG. 2 relates to preparation of a template which is smaller than its sample.

Referring first to FIG. 1, the initial step of the method of preparing the template is preparation of a mixture comprising a liquid silicone rubber and a curing agent for the silicone rubber. Preferably, the silicone rubber and the curing agent are manufactured by the General Electric Company. The silicone may be that designated by General Electric as RTV 700 and the curing agent may be one of the family of curing agents for the silicone rubber, preferably Beta-2. It is evident that silicone rubbers and curing agents of other manufacturers can be employed, and materials other than liquid silicone rubber can be employed to prepare the mixture so long as the enlargement process, described below, can be undertaken.

After the mixture is prepared, the sample is placed in a container and the mixture is poured over the sample to cover the sample to an adequate depth. About ½ inch over the highest point of the sample is normally an adequate depth of the mixture over the sample. The mixture is then allowed to stand and cure for an adequate period of time. With the General Electric silicone described above, curing at room temperature normally takes from 18 to 24 hours. Curing can be accelerated substantially by heating the mixture to between 200° and 250° F.

After the mold has hardened, it is then immersed in a bath of a liquid which can be absorbed by the constituents of the mold in order to increase the size of the mold. Preferably, the bath is an organic solvent, such as mineral spirits, naphtha or kerosene, which can be absorbed by the mold. The mold can remain immersed until the desired expanded size has been attained. At that time, the mold is removed from the bath and blown dry of any clinging liquid from the bath, and then a template is prepared by pouring an appropriate hardenable material, such an epoxy resin, into the mold. The template, after hardening, may then be utilized to prepare a permanent mold in the manner described in co-pending application Ser. No. 850,769.

Should the mold remain immersed in the bath too long and therefore grow to an excessively large size, the mold may be permitted to stand in the atmosphere a sufficient period of time to gradually evaporate the bath to reduce the size of the mold. Evaporation speed is greatly increased by heating the mold to a low temperature to increase the partial pressure of the absorbed bath within the mold and drive the liquid from the mold at a far greater rate.

EXAMPLE 1

A mixture consisting of 10 parts of General Electric RTV 700 silicone rubber and 1 part of Beta-2 curing agent is prepared. The mixture is poured over a sample of the product from which a template is to be made, and the mixture is permitted to stand and cure for a period of between 18 and 24 hours. Thereafter, the sample of the product is removed from the mold, leaving a cavity in the mold corresponding precisely to the sample. The mold is then immersed in a bath of mineral spirits for between 5 and 6 hours, with the mold expanding in size about 25%. The mold is removed from the bath, blown dry, and an epoxy resin is poured in the cavity of the mold and permitted to harden. A template results which is 25% larger in size than the sample from which the mold is prepared, with the template being identical in all detail to the initial sample.

Preparation of a reduced-size template from a similar sample is depicted in FIG. 2. First, a mixture comprising silicone rubber, a curing agent, and a reductant in the form of a solvent is prepared. Identical to the enlargement procedure described above with regard to FIG. 1, the silicone rubber and curing agent may be respectively the RTV 700 silicone rubber of the General Electric Company, with the curing agent being the Beta-2 curing agent of General Electric. The solvent may be naphtha, mineral spirits, kerosene or any organic equivalent, with naphtha or mineral spirits being preferred.

Before covering the sample with the mixture, the mixture may be placed in a vacuum chamber which has a vacuum of about 24 pounds per square inch. The vacuum removes any bubbles of gas which might be entrapped in the liquid mixture. The mixture is then poured over the sample to a depth of about ½ inch above the highest point of the sample, and, if necessary, the covered sample is returned to the vacuum chamber to remove any bubbles that may have formed in the mixture when being poured over the sample.

The mixture is permitted to stand and cure, and after it has hardened sufficiently, the sample is removed, leaving a cavity in the mold which is an exact negative of the sample. The mold may then be permitted to remain in the atmosphere, and it will gradually shrink in size. However, such a proces can require several days, and to greatly increase the speed of the reduction process, the mold is introduced into a warm oven at between 200° and 250° F. to accelerate the shrinkage of the mold. It is then removed from the oven, and a template is prepared by pouring a hardenable material, such as epoxy resin, into the cavity of the mold and permitting the material to harden.

If the mold remains in the oven too long so that it has shrunk to too small a size, it may be placed in a bath of the solvent for a short period of time to again grow to the desired size, in precisely the manner described above with regard to the enlargement process of FIG. 1.

EXAMPLE 2

A mixture of 10 parts of General Electric RTV 700 silicone rubber, one part Beta-2 curing agent, and 10 parts naphtha is prepared. The mixture is placed in a vacuum chamber for several minutes at a vacuum of 24 pounds per square inch in order to remove entrapped gas bubbles. The mixture is then poured over a sample, and the mixture plus the sample are then reintroduced into the vacuum chamber for an additional 5 minutes in order to remove any bubbles that may have formed in the mixture while being poured over the sample. The mixture then is permitted to stand and cure for 12 hours. After the curing time elapsed, the sample is removed from the temporary mold and the mold is introduced into a warm oven until the mold shrinks 25% in dimension. The mold is then removed from the oven, and an epoxy resin is introduced into the mold in order to form the template. A template results which is reduced in size by 25% but otherwise is identical to the sample.

In either embodiment of the invention, it has been found that silicone rubber and a related curing agent introduced in a ratio of 10 parts silicone rubber to 1 part curing agent from an acceptable mold which may be enlarged in size by immersing the mold in naphtha, mineral spirits, or any other appropriate enlargant. While silicone rubber is preferred, other equivalent materials can be substituted so long as growth by immersion is possible, and the resulting temporary mold does not react with the hardenable material introduced to form the template.

Similarly, it is preferred that silicone rubber, a curing agent, and an appropriate liquid reductant, such as naphtha or mineral spirits, are combined to form the mixture for preparation of mold which is ultimately shrunk for preparation of a reduced-sized template. In the same manner, however, other materials can be used to form the mixture so long as the resulting temporary mold, after curing, can be shrunk in size.

In accordance with the method of the invention, increasing or decreasing in size of the mold approximately 25% is attainable. If a larger increase or decrease in size is desired, the process of the invention may be repeated by preparation of another temporary mold from the template resulting from the process, and then proceeding with further enlargement or reduction of the size of the second temporary mold, as desired, to permit preparation of another template. This procedure may be repeated any number of times until the desired size template has resulted.

Because of the use of a solvent, either to increase the size of the temporary mold or as a constituent of the mold to facilitate its reduction, the temporary mold is unstable in that any mold containing the solvent will gradually shrink when exposed to the atmosphere. Thus, when the desired size of the temporary mold has been attained, it is preferrable that the template be poured without substantial delay.

Achievements

The invention provides a very simple, yet exact, means for producing a template which is a precise reproduction of the sample from which it is made, and which is either larger or smaller in size, as the case may be. Human errors are eliminated because no etching or carving of the temporary mold for the template is required. The attainable sizes for the template are virtually infinite. Inaccurancies in size of the temporary mold can readily be rectified because of use of a solvent which can be absorbed by or evaporated from the mold, as required.

Various changes can be made to the invention without departing from the spirit thereof or scope of the following claims:

What is claimed is:

1. A method of preparing a template for a product from a sample of the product, comprising the steps of
    a. preparing a mixture of liquid rubber and a curing agent,
    b. covering the sample with the mixture,
    c. permitting the mixture to harden about the sample to form a mold,
    d. removing the sample from the mold to form a cavity in the mold,
    e. altering the size of the cavity of the mold, by proportionately and permanently changing the dimensions of the mold after the mixture has hardened, and
    f. pouring a hardenable material into the mold to form the template.

2. A method according to claim 1 in which method step "e" comprises enlarging the size of the cavity of the mold, and further includes immersing the mold in a bath of an enlargant for a predetermined period of time to proportionally increase the size of the mold.

3. A method according to claim 2 in which the bath is a solvent.

4. A method according to claim 3 in which the solvent is mineral spirits.

5. A method according to claim 3 in which the solvent is naphtha.

6. A method according to claim 1 in which method step "c" includes heating the mixture to between 200° F. and 250° F.

7. A method according to claim 1 in which the hardenable material is an epoxy resin, and method step "f" includes pouring the liquid epoxy resin into the mold and permitting the resin to harden to form the template.

8. A method according to claim 1 in which the liquid rubber of method step "a" comprises silicone rubber.

9. A method according to claim 1 in which method step "a" includes mixing ten parts of liquid rubber with one part curing agent.

10. A method according to claim 1 in which method step "a" includes adding a liquid reductant to the mixture, and method step "e" comprises reducing the size of the cavity of the mold by evaporating a predetermined portion of the reductant from the mold to proportionally reduce the size of the mold.

11. A method according to claim 10 including the method step after method step "a" of placing the mixture in a vacuum chamber to remove any entrapped gas bubbles.

12. A method according to claim 10 including the method step after method step "b" of placing the covered sample in a vacuum chamber to remove any entrapped gas bubbles.

13. A method according to claim 10 in which the reductant is naptha.

14. A method according to claim 10 in which the reductant is mineral spirits.

15. A method according to claim 10 in which the reductant is added in an amount equal in volume to that of the liquid rubber.

16. A method according to claim 10 in which method step "e" further includes heating the mold to accelerate evaporation of the reductant.

17. A method of preparing an enlarged template for a product from a sample of the product, comprising the steps of
    a. preparing a mixture of liquid rubber and a curing agent,
    b. covering the sample with the mixture,
    c. permitting the mixture to harden about the sample to form a mold,
    d. removing the sample from the mold to form a cavity in the mold,
    e. enlarging the size of the cavity of the mold by immersing the mold in a bath of an enlargant for a predetermined period of time to proportionally and permanently increase the size of the mold, and
    f. pouring a hardenable material into the mold to form the template.

18. A method according to claim 17 in which the liquid rubber of method step "a" comprises silicone rubber and the rubber and the curing agent are respectively mixed in a 10:1 ratio, and in which the enlargant of method step "e" comprises a solvent.

19. A method of preparing a reduced template for a product from a sample of the product, comprising the steps of
    a. preparing a mixture of liquid rubber, a curing agent and a reductant,
    b. placing the mixture in a vacuum chamber to remove any entrapped gas bubbles,
    c. covering the sample with the mixture,
    d. permitting the mixture to harden about the sample to form a mold,
    e. removing the sample from the mold to form a cavity in the mold,
    f. reducing the size of the cavity of the mold by evaporating a predetermined portion of the reductant from the mold to proportionally and permanently reduce the size of the mold, and
    g. pouring a hardenable material into the mold to form the template.

20. A method according to claim 19 in which the liquid rubber of method step "a" comprises silicone rubber, the reductant comprises naphtha, and the silicone rubber, naphtha and curing agent are respectively mixed in a 10:10:1 ratio, and in which method step "f" further includes heating the mold to accelerate evaporation of the naphtha.

* * * * *